United States Patent [19]
Simmons

[11] Patent Number: 5,493,094
[45] Date of Patent: Feb. 20, 1996

[54] PREPARATION OF FULLERENES AND APPARATUS THEREFOR

[76] Inventor: Walter N. Simmons, 451 Scrabble Rd., Martinsburg, W. Va. 25401

[21] Appl. No.: 344,127

[22] Filed: Nov. 23, 1994

Related U.S. Application Data

[62] Division of Ser. No. 4,694, Jan. 14, 1993, Pat. No. 5,393,955.

[51] Int. Cl.$^6$ .............................. B23K 10/00; C01B 31/00
[52] U.S. Cl. .................. 219/121.52; 219/121.51; 219/121.59; 219/121.43; 423/448; 423/445 R; 423/DIG. 40
[58] Field of Search .................... 219/121.59, 121.52, 219/121.36, 121.51, 121.48, 121.43; 204/157.47, 157.4; 423/447.8, 445 R, DIG. 40, 448; 373/18–22

[56] References Cited

U.S. PATENT DOCUMENTS

| | | | |
|---|---|---|---|
| 4,037,043 | 7/1977 | Segsworth | 13/9 |
| 5,273,729 | 12/1993 | Howard et al. | 423/445 |
| 5,300,203 | 4/1994 | Smalley | 204/157.41 |

FOREIGN PATENT DOCUMENTS

WO9204279  3/1992  WIPO.

OTHER PUBLICATIONS

W. W. Kroto et al., "$C_{60}$ Buckminsterfullerene"; Nature, 318, 162–163 (1985).
R. E. Haufler et al., "Carbon Arc Generation of $C_{60}$"; Matl. Res. Soc. Symp. Proc., 206, 627–637 (1991).
R. F. Curl & R. E. Smalley, "Fullerenes"; Sci. Amer. [10], 54–63 (1991).
R. L. Whetten et al., "Spectroscopic & Photophysical Properties of the Soluble $C_n$ Molecules"; Matl. Res. Soc. Symp. Proc., 206, 639–650 (1991).
Ulvick Industries, Inc. Product Bulletin, Fullerene Production Systems Bucky I and Bucky II, undated (prior to Sep. 27, 1992).
E. Pennisi, "Buckyballs Still Charm"; Sci. News, 140, 120–123 (1991).
G. Zhennan et al., "Buckerminsterfullerene $C_{60}$"; J. Phys. Chem., 95, 9615–9618 (1991).
R. M. Baum, "Simple Synthesis of C60 Molecule Triggers Intense Research Effort"; Chem. & Eng. News, Oct. 29, 1990, 22–25.
E. Pennisi, "Simple Recipe Yields Fullerene Tubules"; Sci. News, 142, 36 (1992).
H. Ajie et al., "Characterization of the Soluble all–Carbon Molecules $C_{60}$ and $C_{70}$"; J. Phys. Chem., 94, 8630–8633 (1990).
T. Padeep & C. N. R. Rao, "Preparation of Buckminsterfullerene, $C_{60}$"; Natl. Res. Bull., 26, 1101–1105 (1991).
A. S. Koch et al., "Preparation of Fullerenes with a Simple Benchtop Reactor"; J. Org. Chem., 56, 4543–4545 (1991).
L. Zhu et al., "Preparation, Separation & Characterization of Fullerene $C_{60}$ & $C_{70}$"; Fullerene Sci. & Tech., 1 (1), 45–53 (1993).

Primary Examiner—Mark H. Paschall
Attorney, Agent, or Firm—Edward J. Newitt

[57] ABSTRACT

Fullerene-containing soot, is prepared by evaporating an electrically conductive carbon rod in an electric arc plasma sustained in a tubular evaporator between coaxially aligned carbon rods in a stream of inert gas flowing coaxially over the carbon rods at a flow rate of at least 0.02 m$^3$/h, and collecting the soot from the evaporator walls.

9 Claims, 1 Drawing Sheet

PREPARATION OF FULLERENES AND APPARATUS THEREFOR

This is a division of application Ser. No. 08/004,694, filed Jan. 14, 1993 now U.S. Pat. No. 5,393,955.

FIELD OF THE INVENTION

This invention relates to the preparation of mixtures of spherical allotropes of carbon containing 60 or 70 carbon atoms known as "fullerenes". More particularly the invention relates to an improved process for preparing said fullerenes and to an apparatus for operating the invention process.

BACKGROUND OF THE INVENTION

Kroto et al., Nature, 318, 162 (1985) were among the first to prepare and characterize a highly stable, spherical "soccerball shaped allotrope of carbon containing 60 carbon atoms. This allotrope, and other, higher spherical allotropes of carbon containing 70 or more carbon atoms, subsequently named fullerenes, have since been isolated by several groups of workers from carbonaceous soot produced by evaporating carbon, usually graphite, in an inert gas atmosphere, and allowing the vapor to condense on a surface. WO 92/04279 and Kratschmer et al., Nature, 347, 354 (1990) disclose a preparative method wherein graphite rod electrodes are vaporized by application of high intensity electric current in an inert atmosphere such as helium at a pressure of about 50–400 torr, preferably about 100 torr. The resulting black soot is scraped from the collecting surfaces inside the evaporation chamber and dispersed in a solvent such as benzene. The $C_{60}$ and $C_{70}$ fullerenes are soluble and readily separated from the residual, insoluble soot. "Yields" of fullerenes, i.e. the percentage of fullerenes in the deposited soot, of 2 to 10% are disclosed.

Haufler et al., Matl. Res. Soc. Symp. Proc. 206, 627 (1991), disclose an apparatus and method of preparing soot containing 10% to 15% fullerenes, by vaporizing graphite in an AC carbon arc struck between two coaxially opposed graphite electrodes separated by a gap of <1 mm to 5 mm, in a flow of helium directed at the arc zone at right angles to the electrodes. A carbon evaporation rate of 1 g per min from a 6 mm diameter graphite rod and a fullerene production rate of up to 10 g per hour (15% yield) was reportedly obtained at a helium pressure of 100–200 torr. A similar apparatus and method is described by Curl and Smalley, Sci. Amer. [10], 54 (1991). In both the Curl and Haufler methods, helium flows to the evaporation chamber from an inlet located at right angles to the axis of the arcing, coaxial electrodes.

Haufler et al., ibid, page 633–634, also describe an alternative fullerene production apparatus wherein a rotating graphite sample is subjected to heat and Q-switched laser activation using a very slow flow of helium directed coaxially over the sample. A 10% yield of fullerenes, based on carbon evaporated, was obtained at 1200° C.; higher yields were predicted from operation at higher temperatures but were not demonstrated.

Whetten et al., Matl. Res. Soc. Symp. Proc. 206, 639 (1991), disclose fullerene production in "yields" said to be considerably higher than reported by others, using an AC carbon arc method similar to that of Kratschmer et al. operating in helium at 100–350 torr pressure. In an experiment wherein 50% of a 6 inch×0.25 inch diameter rod electrode of high purity graphite was evaporated, 0.5 g of soot was obtained, 25–40% of which was soluble in boiling toluene. Helium pressure is cited as a major factor determining fullerene yield.

A commercial fullerene production apparatus, "Bucky II", available from Ulvick Industries, Inc., is claimed in Ulvick's literature to provide over 300 g of soot in an 8 hour period. The apparatus employs two rotating/translating graphite rod electrodes of either 0.25 inch (0.635 cm) or 0.5 inch (1.3 cm) diameter, each arcing against a coaxially aligned 1 inch diameter stationary water-cooled electrode having a graphite block attached to its end. The electrodes are located inside a vacuum chamber equipped with a water-cooled chimney wherein soot collects. The chamber is operated in helium at 150–200 torr pressure.

The present invention provides an improved apparatus and process for producing fullerenes by arc evaporation of carbon in a flow of inert gas, the improvement residing in several factors, including the surprising discovery that fullerene yields are highly influenced by the direction of flow of the inert gas.

SUMMARY OF THE INVENTION

An improved process is provided for preparing graphitic soot comprising $C_{60}$ and $C_{70}$ allotropes of carbon having a fullerene structure (fullerenes), said process comprising evaporating, in a tubular evaporator, a solid cylindrical electrically conductive carbon rod in an electric arc plasma sustained between said carbon rod and a second solid cylindrical electrically conductive carbon rod, each of said carbon rods being aligned coaxially in said tubular evaporator, and at least one of said carbon rods being moveable, in a stream of at least one inert gas, said stream flowing coaxially over said carbon rods at an inlet flow rate of at least about 0.02 $m^3/h$, and collecting said soot from internal surfaces of said tubular evaporator. Preferably the at least one inert gas is helium, the inlet flow rate is at least 0.05 $m^3/h$, more preferably at least 0.1 $m^3/h$, the inert gas flows from the negative electrode end to the positive electrode end of the tubular evaporator, and the electric current supplied to the electrodes is DC.

Also provided is an apparatus for producing fullerenes by the evaporation of carbon in an electric arc plasma, said apparatus consisting essentially of:

(i) a tubular evaporator (tube) capable of sustaining reduced pressure and having, at each end, an endplate through which a cylindrical electrode is inserted, at least one of said endplates being an electrical insulator, each of said electrodes being aligned substantially along the axis of said tube and having attached to its intra-tube end a solid cylindrical electrically conductive carbon rod aligned substantially along the axis of said tube, at least one of said electrodes being moveable along the axis of said tube such that said carbon rods may be brought into electrically conducting contact with one another;

(ii) ports located substantially at opposite ends of said tube for admitting and withdrawing gas, respectively, such that gas flow occurs along the axis of said tube;

(iii) cooling means to prevent melting of said tube and associated components during sustained operation of an electric arc within said tube;

(iv) means for supplying electrical power to said electrodes sufficient to sustain an electric arc between said electrodes.

Preferably, in the apparatus of the invention, a first electrode is stationary and a second electrode is moveable along the tube axis, said first electrode supporting an electrically conductive carbon rod of larger diameter than that supported by the moveable electrode. It is also preferred that the endplate supporting the stationary electrode is electrically insulating and the endplate supporting the moveable electrode is electrically conductive. The inert gas flow is preferably from the insulating (negative) endplate end to the conductive (positive) endplate end of the tube. Preferably also, the gap between the largest diameter rod and the tube wall is at least 1.3 cm.

DETAILED DESCRIPTION OF THE INVENTION

Figure 1:
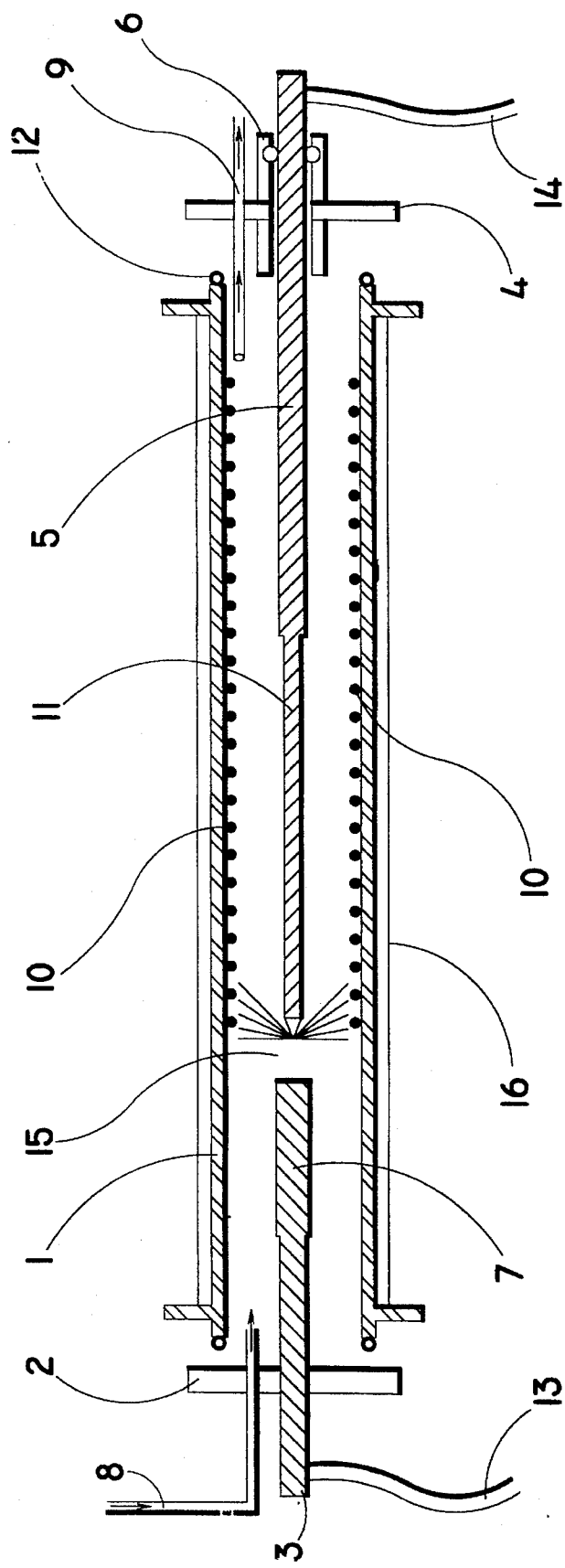
FIG. 1 is a schematic diagram of an embodiment of the apparatus according to the invention, indicating the tubular evaporator, a stationary electrode and a moveable electrode located coaxially therein, electrically conductive carbon rods affixed to said electrodes, inlet and outlet ports for inert gas and pressure control, and the approximate location of carbon evaporation and soot deposition.

The apparatus provided by the invention for preparing fullerene-containing carbon soot is of simple, economical design in comparison to other known devices for fullerene production, yet provides substantially higher yields of fullerenes than can be obtained with said art devices.

By "soot" is meant finely divided particulate carbonaceous material deposited on the walls of the tubular evaporator during carbon evaporation ("burn"). By "soluble soot" is meant that portion of deposited soot that dissolves in toluene at room temperature within about 20 minutes. As the toluene-soluble soot has been found to consist almost entirely of fullerenes, the dry residue after filtration from undissolved soot and evaporation of the toluene, expressed as a percent of the total soot, is herein defined as the "fullerene content (%)"; said dry residue, expressed as a percent of the total carbon evaporated, is herein defined as the "fullerene yield".

By "carbon evaporated" is meant the total weight lost by the moveable carbon rod (11) during carbon arc evaporation.

Total carbon evaporated comprises deposited soot (10), carbonaceous build-up on the fixed carbon rod, and lumpy carbon deposits found elsewhere in the tubular evaporator. The build-up and lumpy deposits also contain fullerenes, some in tubular form, not quantitatively accounted for herein. Soot obtained during the present process comprises at least about 20% by weight of the total carbon evaporated.

The main element of a preferred embodiment of the apparatus of the invention shown in FIG. 1 is a tubular evaporator (tube (1)) having two endplates (2, 4), one of which (2) is electrically insulating. The insulating endplate (2) may be securely fastened, e.g. bolted, to tube (1), or, preferably, it is held in place simply by reduced pressure in the tube. An electrode (3), normally stationary, is fastened to said insulating endplate (2) which is, in turn, firmly secured to the tube (1). A second electrode (5) is moveable and slides through a guide bushing (6) mounted in electrically conductive endplate (4). A solid, cylindrical, electrically conductive carbon rod (7, 11) is attached to each electrode. The rod (7) attached to electrode (3) is of larger diameter than the rod (11) attached to the moveable electrode (5), but at least 1.3 cm smaller than the diameter of tube (1).

The diameter and length of tube (1) are not critical. However, as the diameter of the tube increases, the flow of inert gas must be increased to maintain an effective gas velocity within the tube; cost may therefore dictate an optimum tube diameter. Conversely, in a very small diameter tube, it may be difficult to electrically insulate the electrodes from the tube wall sufficiently to prevent accidental arcing to the tube wall. Suitable tubes include those having an internal diameter of about 5 to 25 cm, and a length in the range of about 30 to 305 cm.

An O-ring in guide bushing (6) substantially prevents air leakage into the tube (1). Gaskets or O-rings (12) seal the tube to the endplates (2, 4). The tube (1) is cooled by water-cooling means (16) surrounding said tube.

Inert gas, e.g. helium, enters tube (1) via inlet line (8) located at the stationary electrode end, and leaves said tube via exit port (9) located at the moveable electrode end. Pressure in tube (1) may also be controlled by means of exit port (9).

A critical feature of the present fullerene production apparatus is the flow of inert gas along the axis of the electrodes and the carbon rods attached thereto. Most preferably the gas flows from the insulated (negative) electrode end to the conductive (positive) electrode end, whereby the arc plasma ("burn") area (15) is continuously purged with fresh inert gas. A fraction, normally at least about 20% by weight, of the evaporated carbon is carried downstream in the gas flow and condenses as fullerene-containing soot on the tube wall (10).

For ease of construction, the stationary electrode is insulated from tube (1) by means of insulating endplate (2). Lexan® polycarbonate resin is suitable for this purpose; however, many other suitable insulating materials are available for use. The flow of inert gas keeps insulating endplate (2) and, indeed, the entire area from endplate (2) to the plasma (burn) area (15) free from accumulating materials which can degrade the insulating properties of endplate (2).

The present apparatus is of very simple design, easy to assemble, disassemble and clean. Carbon deposits are easily removed from the straight tubular evaporator. The apparatus is also inexpensive to construct.

In the operation of one embodiment of the fullerene preparation apparatus according to the invention process, power is supplied to the electrodes by means of a commercial DC welder, or other source, capable of supplying approximately 100 to 200 amps at 20 to 30 volts connected through flexible wires (13, 14) to the electrode holders (3, 5). The stationary electrode (3) is preferably negative.

A carbon rod (7), preferably a low-cost "guaging" electrode (L-Tech) comprised of graphitic carbon conventionally used in welding equipment, is attached to the stationary electrode (3). A smaller diameter carbon rod (11) of similar composition is attached to the moveable electrode (5). Typically, tube (1) has an internal diameter of about 7.9 cm, rod (7) has a diameter of 1.9 cm, and rod (11) a diameter of 0.635 cm. A partial vacuum in the range of about 20 to 760 torr, preferably about 60 to 200 torr, is applied to tube (1) via exit port/vacuum line (9). An inert gas, preferably helium, is then introduced to the tube through entry port (8). Gas flow rate in the entry port is at least about 0.02 to about 1 m$^3$/hour, preferably at least about 0.05 m$^3$/hour, most preferably at least about 0.1 m$^3$/hour.

An arc is struck between the carbon rods by moving electrode (5) until carbon rod (11) contacts carbon rod (7), and then separating said carbon rods by approximately 0.3 mm, or as appropriate to maintain a stable arc plasma. As carbon rod (11) evaporates during the "burn", said rod (11) is moved toward rod (7) to maintain a relatively constant arc gap, the rod "feed" rate being in the range of about 0.01 cm/min to about 2 cm/min, preferably about 0.05 to about 0.6 cm/min.

It has been discovered that the fullerene content of the deposited soot, and the overall yield of fullerenes based on carbon evaporated, are significantly increased by operating the arc in a stream of inert gas flowing coaxially over the electrodes, in contrast to processes of the art wherein helium flow is typically at right angles to the electrodes, or non-directional. It has been further discovered, quite unexpectedly, that the fullerene content of the soot is still further increased, by as much as a factor of 2, when the coaxial gas flow is from the negative electrode end toward the positive electrode end, as shown in Table 1 for experiments wherein all conditions were identical except for the direction of helium flow:

TABLE 1

| Power supply: | 100–120 amps; 25–27 volts; |
|---|---|
| Pressure: | 74–125 torr; |
| Fixed carbon rod: | 1.905 cm dia. |
| Moveable carbon rod: | 0.635 cm dia. |
| Rod feed rate: | 0.5 cm/min. |
| Helium flow rate: | 0.14 m$^3$/h |
| Fullerene content of soot: flow (+) to (−): | 10% |
| Fullerene content of soot: flow (−) to (+): | 20% |

Additionally, in the process of preparing fullerenes in the invention apparatus, it has been found that the fullerene content of the deposited soot increases with increasing inert gas flow rate (Table 2), and with decreasing carbon rod feed rate (Table 3); in these Tables, conditions other than helium flow rate (Table 2) or carbon rod feed rate (Table 3) were essentially the same as those of Table 1:

TABLE 2

| Helium Flow (m$^3$/h) | Fullerene Content (%) |
|---|---|
| 0 | 2 |
| 0.07 | 12 |
| 0.14 | 17 |
| 0.37 | 20 |

TABLE 3

| Carbon Rod Feed Rate (cm/min) | Fullerene Content (%) |
|---|---|
| 0.1 | 33 |
| 0.5 | 30 |
| 0.6 | 28 |
| 0.7 | 26 |
| 0.8 | 22 |
| 1.0 | 14 |

In the present process, when carbon rod (11) has been extensively consumed, typically by about 70–90%, the arc is quenched by shutting off the power supply and vacuum pump. The flow of inert gas is continued until the pressure in the tube equals the outside pressure. The endplates are then removed and the soot deposits on the tube walls are removed and extracted with toluene as previously indicated. A fresh carbon rod (11) may be inserted and the apparatus reassembled and fullerene production resumed. Clean out and reassembly can be accomplished in under 5 min. It will be appreciated by those skilled in the art that the present apparatus can readily be modified for semi-continuous or continuous feed of carbon rod (11) and hence sustain carbon evaporation and fullerene production for relatively long periods.

The source and type of carbon rods employed in the present invention is not critical as long as they are electrically conductive. Rods can be prepared using any of the various forms of commercially available carbon, such as graphite, amorphous and glassy carbon, or mixtures thereof. Graphitic carbon is preferred, although rods of high purity graphite have been found to be less effective and considerably more expensive than lower, less expensive grades of graphitic carbon. Graphitic carbon rods having a degree of porosity such as the above mentioned guaging electrodes are especially suitable for use in the present invention process.

The diameter of carbon rod (7) should be larger than that of the moveable carbon rod (11), preferably at least 1.3 cm larger. Carbon rod (7) should also have a diameter at least 1.3 cm smaller than that of tube (1), as previously indicated. As the diameter of the moveable carbon rod (11) is increased, the power amperage and effective velocity of inert gas required to maintain optimal fullerene yields must also be increased; for this reason, in the present apparatus, the maximum effective diameter of carbon rod (11) is about 0.635 cm.

The evaporator chamber tube (1) may be constructed of any suitably rigid material that is stable and unreactive under carbon evaporation conditions; stainless steel is a suitable material of construction.

No attempt has been made herein to determine the relative proportions of $C_{60}$ and $C_{70}$ allotropes, or the presence of other toluene-soluble allotropes. It is to be understood that variations in $C_{60}/C_{70}$ ratio, and the presence of other toluene-soluble species are to be included within the scope of "fullerenes" as herein defined. It is also to be understood that solvents other than toluene may be used to extract fullerenes from the condensed carbon evaporate; other suitable solvents include benzene, xylenes and other alkyl benzenes, carbon disulfide and carbon tetrachloride.

The inert gas to be used in the present invention can be any gas, or mixtures thereof, that is truly inert under carbon evaporation conditions. The noble gases are preferred, helium being most preferred.

The following examples are intended to be illustrative embodiments of the invention but not to limit in any way the scope of the claims below.

EXAMPLE 1

An apparatus as shown in FIG. 1, constructed as described hereinabove, was equipped with a 7.9 cm ID tube (1), a 1.905 cm L-Tech guaging electrode carbon rod (7) and a 35.6 cm × 0.635 cm diameter guaging electrode carbon rod (11) inserted, respectively, in the end of the fixed electrode holder (3) and the moveable electrode holder (5). Rod (11) initially weighed 21.65 g. Helium was introduced at an inlet flow rate of 0.14 m$^3$/h, and flowed coaxially from the fixed electrode end to the moveable electrode end. Pressure in tube (1) was maintained at 76 torr.

Using a DC welding power supply, a DC arc was struck between rods (7) and (11) and sustained at a voltage of 27–30 volts and 105–110 amps. As rod (11) was consumed, the arc was maintained by feeding rod (11) at a rate of 0.4 cm/min.

After 16.75 g (77%) of rod (11) was evaporated, the power supply was shut off and the "burn" terminated. The soot collected in tube wall area (10) weighed 5.4 g. Carbon build-up on rod (7) weighed 7.7 g, and additional graphitic lumps weighing 3.6 g were recovered from the tube. The soot was treated with an excess of toluene for 20 minutes. Residual soot was removed by filtration and the toluene extract was evaporated to dryness. Fullerene content of the soot was found to be 29%. Overall yield of fullerenes, based on total carbon evaporated: 9.3%.

A comparative experiment run under conditions identical to the above except that the helium atmosphere in the tube was stationary (no flow) gave the following results: weight of carbon evaporated: 13.00 g; weight of non-soot deposits: 10.5 g; weight of soot collected: 1.1 g; Fullerene content of soot: 5%; overall yield of fullerenes, based on carbon evaporated: 0.4%

EXAMPLE 2

The apparatus, materials and operational details used in Example 1 were repeated except that the helium flow was 0.028 m$^3$/h.

After 20.0 g (93%) of rod (11) had been evaporated, the power supply was shut off and the "burn" terminated. The soot collected in tube wall area (10) weighed 4.2 g. Carbon build-up on rod (7) weighed 9.7 g, and additional graphitic lumps weighing 5.6 g were recovered from the tube. The fullerene content of the soot was found by toluene extraction to be 24%. Overall yield of fullerenes, based on total carbon evaporated: 5.0%.

Although certain specific embodiments and descriptive details of the invention have been disclosed herein, it will be apparent to those skilled in the art that modifications or variations of such details can readily be made, and such modifications or variations are considered to be within the scope of this invention as claimed hereinbelow.

I claim:

1. An improved process for preparing graphitic soot comprising $C_{60}$ and $C_{70}$ allotropes of carbon (fullerenes), said process comprising evaporating, in a tubular evaporator, a solid cylindrical electrically conductive carbon rod in an electric arc plasma sustained between said carbon rod and a second solid cylindrical electrically conductive carbon rod, one of said carbon rods being attached to a negative electrode mounted at one end of said evaporator, and the other carbon rod being attached to a positive electrode mounted at the opposite end of said evaporator, each of said carbon rods being aligned coaxially in said tubular evaporator, and at least one of said carbon rods being moveable, in a stream of at least one inert gas, said stream flowing coaxially over said carbon rods at an inlet flow rate of at least about 0.02 m$^3$/h, and collecting said soot from internal surfaces of said tubular evaporator.

2. Process according to claim 1 wherein the inert gas is helium.

3. Process according to claim 2 wherein the inlet flow rate is at least about 0.1 m$^3$/hour.

4. Process according to claim 2 wherein the electric arc is a DC arc.

5. Process according to claim 2 wherein the reactor pressure is in the range of about 20 to about 760 torr, 6. Process according to claim 2 wherein the electrode deposits comprise tubular forms of said $C_{60}$ and $C_{70}$ fullerene allotropes.

7. Process according to claim 1 wherein said inert gas stream flows coaxially over said carbon rods from the negative electrode end to the positive electrode end of said tubular evaporator.

8. In a process for preparing $C_{60}$ and $C_{70}$ allotropes of carbon (fullerenes) by evaporating carbon in an electric arc plasma sustained in an inert gas atmosphere at reduced pressure between carbon electrodes, at least one of which is moveable, and condensing the evaporated carbon, the improvement comprising use of a tubular evaporator wherein the carbon electrodes are aligned coaxially therein, and an inert gas flows coaxially over said carbon electrodes at an inlet flow rate of at least about 0.02 m$^3$/h.

9. The process according to claim 8 wherein the inert gas consists essentially of helium and flows from the negative electrode end to the positive electrode end of said tubular evaporator.

* * * * *